(12) United States Patent
McWilliams

(10) Patent No.: US 7,257,883 B2
(45) Date of Patent: Aug. 21, 2007

(54) METHOD AND APPARATUS FOR MANUFACTURING AN ELECTRIC HEATER

(75) Inventor: Kevin Ronald McWilliams, Stratford Upon Avon (GB)

(73) Assignee: Ceramaspeed Limited (GB)

( * ) Notice: Subject to any disclaimer, the term of this patent is extended or adjusted under 35 U.S.C. 154(b) by 459 days.

(21) Appl. No.: 10/503,293

(22) PCT Filed: Jan. 27, 2003

(86) PCT No.: PCT/GB03/00308

§ 371 (c)(1),
(2), (4) Date: Jan. 24, 2005

(87) PCT Pub. No.: WO03/066276

PCT Pub. Date: Aug. 14, 2003

(65) Prior Publication Data

US 2005/0125992 A1    Jun. 16, 2005

(30) Foreign Application Priority Data

Feb. 8, 2002    (GB) ................................ 0202957.7

(51) Int. Cl.
*H05B 3/00* (2006.01)

(52) U.S. Cl. .................... 29/611; 29/745; 29/798; 29/848; 29/850; 29/33 F; 219/461.1; 219/548

(58) Field of Classification Search ................ 29/611, 29/745, 798, 848, 850, 33 F; 219/461.1, 219/548
See application file for complete search history.

(56) References Cited

U.S. PATENT DOCUMENTS

| | | | | |
|---|---|---|---|---|
| 5,181,312 A | * | 1/1993 | Gross | .......................... 29/611 |
| 5,282,301 A | | 2/1994 | Roentgen et al. | |
| 5,823,740 A | | 10/1998 | Cybularz et al. | |
| 5,974,658 A | * | 11/1999 | Hughes | ....................... 29/611 |

FOREIGN PATENT DOCUMENTS

| | | |
|---|---|---|
| DE | 2405033 | 8/1975 |
| EP | 0625865 | 11/1994 |

OTHER PUBLICATIONS

International Search Report Mar. 24, 2003.

* cited by examiner

*Primary Examiner*—A. Dexter Tugbang
*Assistant Examiner*—Tim Phan
(74) *Attorney, Agent, or Firm*—Ira S. Dorman

(57) ABSTRACT

In the manufacture of an electric heater, means (24, 26) is provided for feeding and guiding a ribbon heating element (14) progressively into overlying edgewise relationship with a base (2). Means (6, 8) is provided for supporting the base (2) and for effecting relative motion between the base (2) and the feeding and guiding means (24, 26), such that motion of the base (2) is synchronised with feeding of the element (14) as it is fed and guided into the relationship with the base (2), to urge the heating element (14) towards the base (2) and cause an edge portion (22) of the heating element (14) to become embedded in the base (2).

46 Claims, 3 Drawing Sheets

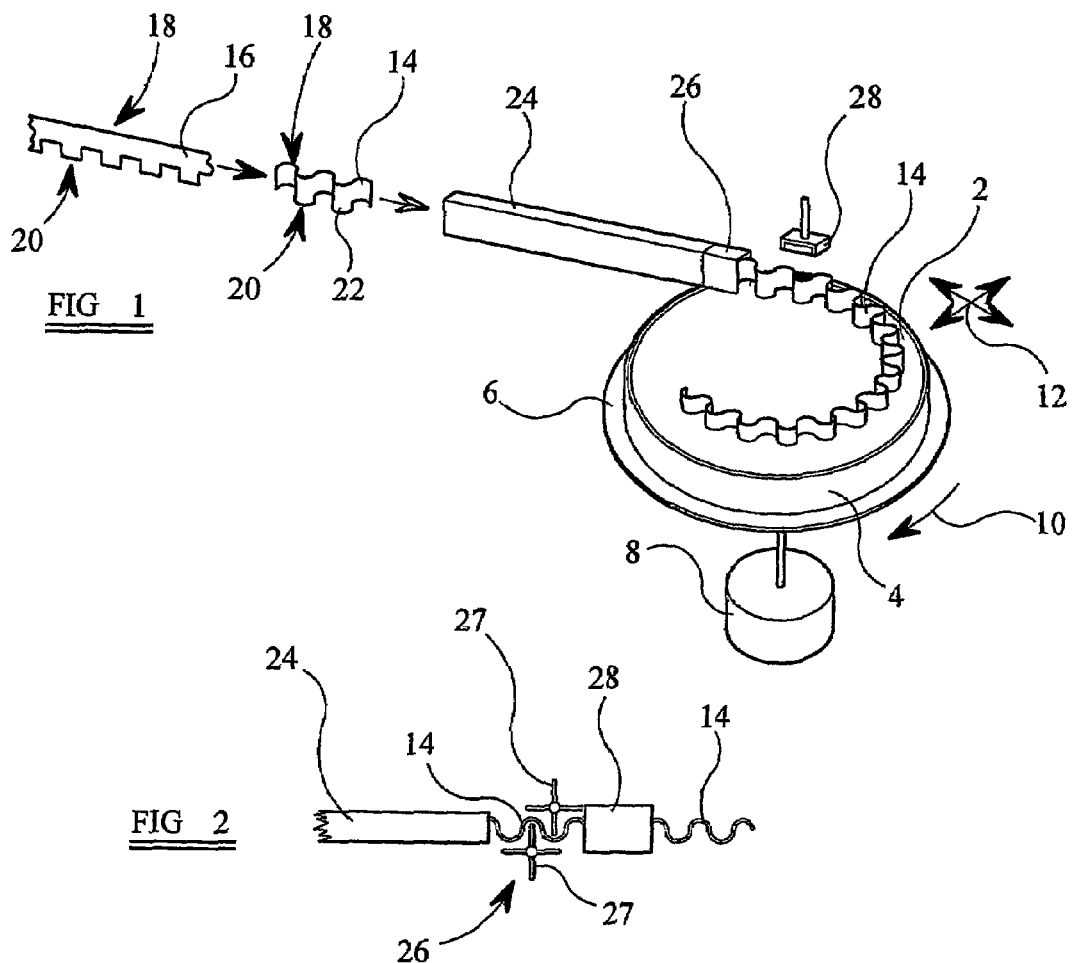
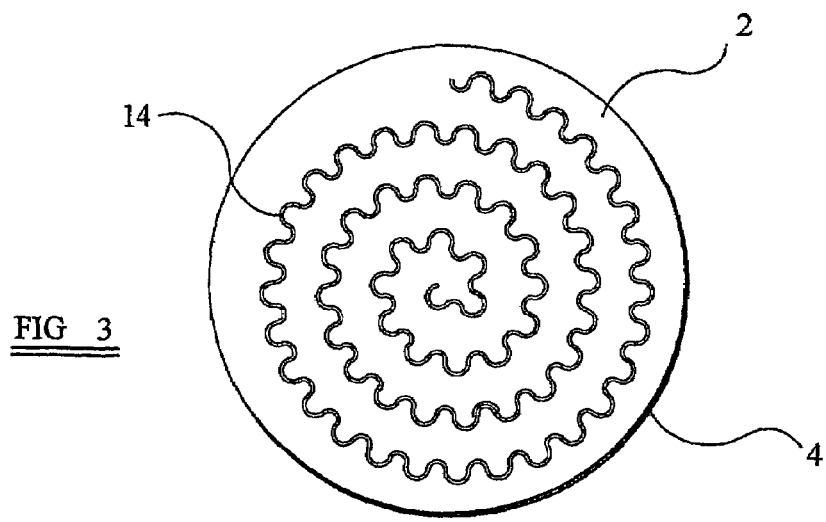

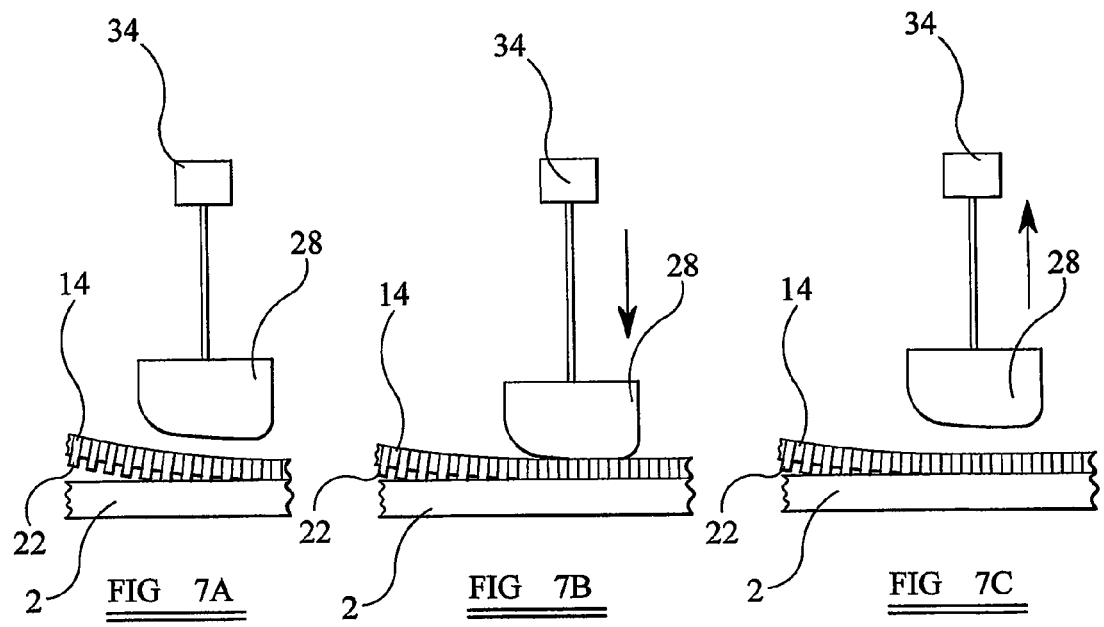
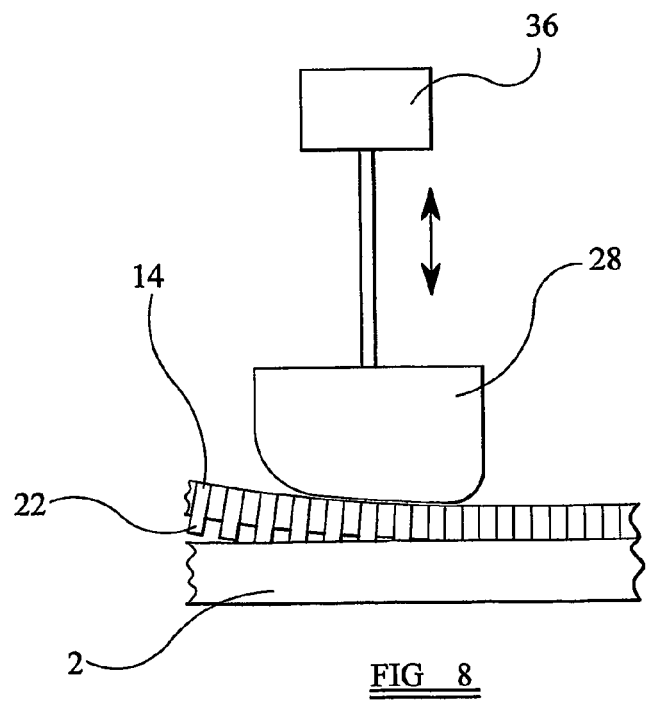

METHOD AND APPARATUS FOR MANUFACTURING AN ELECTRIC HEATER

BACKGROUND OF THE INVENTION

CROSS REFERENCE TO RELATED DOCUMENTS

This application is a 371 of PCT/GB03/00308, filed on Jan. 27, 2003, which claims priority to United Kingdom Application No. 0202957.7, filed on Feb. 08, 2002.

1. Field of the Invention

This invention relates to a method and apparatus for manufacturing an electric heater, such as a radiant electric heater for use in a cooking appliance.

More particularly, the invention relates to a method and apparatus for manufacturing an electric heater in which an elongate corrugated metal ribbon heating element is supported edgewise on a base of thermal and electrical insulation material, the heating element having an edge portion thereof, or one or more parts secured thereto, secured to the base by embedding in the base.

2. Description of the Prior Art

Electric heaters are well known for use in cooking appliances in which an elongate corrugated metal ribbon heating element is supported edgewise on a base of thermal and electrical insulation material, such as microporous insulation material. Such heaters are manufactured by a process in which an elongate planar ribbon heating element is corrugated and then wound into a grooved press tool, the press tool having a groove formed in a pattern corresponding to that required for the heating element in the heater. The press tool is urged towards the surface of an insulation base for the heater, which is located in a special press, and an edge portion of the ribbon heating element protruding from the press tool is caused to be secured by embedding in the insulation base. The edge portion of the ribbon heating element protruding from the press tool is advantageously of profiled form such that it comprises spaced-apart tabs or legs which are caused to be embedded in the insulation base. Alternatively, the ribbon heating element can have separate tabs secured thereto, such as by welding, and these tabs are arranged to protrude from the press tool, for embedding in the insulation base.

This prior art manufacturing process is disadvantageous. Separate press tools have to be provided for each required pattern and size of heating element and such press tools are expensive to manufacture. They are also required to be used with expensive presses producing the necessary high force to embed the heating element in the insulation base. The process is therefore complex and labour-intensive.

SUMMARY OF THE INVENTION

It is an object of the present invention to overcome or minimise these problems.

According to one aspect of the present invention there is provided a method of manufacturing an electric heater in which an elongate corrugated metal ribbon heating element is supported edgewise on a base of thermal and electrical insulation material, the heating element having an edge portion thereof, or one or more parts secured thereto and extending edgewise therefrom, secured by embedding in the base, the method comprising: providing means for feeding and guiding an elongate corrugated metal ribbon heating element progressively into overlying edgewise relationship with a base of thermal and electrical insulation material; providing means for supporting the base and for effecting relative motion between a surface of the base and the means for feeding and guiding the heating element, such that motion of the base is synchronised with feeding of the heating element; and providing means for applying localised edgewise pressure to the heating element, as it is progressively fed and guided into the overlying edgewise relationship with the base, to urge the heating element towards the base and cause an edge portion of the heating element, or one or more parts secured to the heating element and extending edgewise therefrom, to become secured by embedding in the base.

According to a further aspect of the present invention there is provided apparatus for manufacturing an electric heater in which an elongate corrugated metal ribbon heating element is supported edgewise on a base of thermal and electrical insulation material, the heating element having an edge portion thereof, or one or more parts secured thereto and extending edgewise therefrom, secured by embedding in the base, the apparatus comprising: means for feeding and guiding an elongate corrugated metal ribbon heating element progressively into overlying edgewise relationship with a base of thermal and electrical insulation material; means for supporting the base and for effecting relative motion between a surface of the base and the means for feeding and guiding the heating element, such that motion of the base is synchronised with feeding of the heating element; and means for applying localised edgewise pressure to the heating element as it is progressively fed and guided into the overlying edgewise relationship with the base, to urge the heating element towards the base and cause an edge portion of the heating element, or one or more parts secured to the heating element and extending edgewise therefrom, to become secured by embedding in the base.

The elongate corrugated metal ribbon heating element may be initially formed by corrugation of a substantially planar elongate metal ribbon.

The edge portion of the elongate corrugated metal ribbon heating element which is secured by embedding in the base may comprise a continuous edge region of the element, or tabs or legs extending from and integral with the element.

The one or more parts secured to the elongate corrugated metal ribbon heating element and extending edgewise therefrom and secured by embedding in the base, may comprise one or more tabs or legs secured to the heating element.

The means for feeding and guiding the elongate corrugated metal ribbon heating element may comprise a tube or channel arrangement.

The means for feeding and guiding the elongate corrugated metal ribbon heating element may be associated with means for establishing and/or maintaining a desired upstanding orientation of the heating element, such as intermeshing rotatable gear wheels, complementary to a corrugation profile of the heating element, and between which the heating element is arranged to be fed.

The means for supporting the base may be mechanically driven, such as by motor means, such that rotational and/or translational motion of the base is effected in synchronisation with the feeding of the heating element and whereby a desired pattern is effected for the secured heating element.

The means for applying localised edgewise pressure to the heating element may comprise a block, cam, wheel or roller arrangement. Such means for applying localised edgewise pressure may be of stepped form, such as stepped roller form, having a portion for edgewise engagement with the heating element and one or more portions for engaging the surface of the base, whereby embedding, into the base, of the element, or part or parts secured thereto, is limited.

The means for applying localised edgewise pressure may be located at a predetermined fixed distance from the base or may be adapted to be sequentially advanced towards, and retracted away from, the base, such as by electromagnetic, piezoelectric, pneumatic or hydraulic means.

Feeding of the heating element may be effected continuously or in discrete steps. When the feeding is in discrete steps, such feeding may be synchronised with sequential advancement and retraction of the means for applying localised edgewise pressure to the heating element. When the feeding is continuous, the means for applying localised edgewise pressure to the heating element may be arranged to be continuously cyclically advanced and retracted towards and away from the base. The means for applying localised edgewise pressure may be caused to be vibrated, whereby it is rapidly cyclically advanced and retracted towards and away from the base.

The base of thermal and electrical insulation material may comprise microporous thermal and electrical insulation material and may be contained in a support dish, such as of metal.

For a better understanding of the present invention and to show more clearly how it may be carried into effect, reference will now be made, by way of example, to the accompanying drawings in which:

BRIEF DESCRIPTION OF THE DRAWINGS

FIG. 1 is a schematic view of an embodiment of apparatus according to the present invention for manufacturing an electric heater;

FIG. 2 is a detail showing an arrangement in the apparatus of FIG. 1 for maintaining and/or establishing a desired orientation of a heating element during feeding thereof;

FIG. 3 is a plan view of an electric heater produced by the apparatus of FIG. 1;

FIG. 7 shows a stepwise operating scheme for a movable press arrangement in the apparatus of FIG. 1; and FIG. 8 shows a continuous operating scheme for a movable press arrangement in the apparatus of FIG. 1.

DETAILED DESCRIPTION OF THE INVENTION

Figure 4:
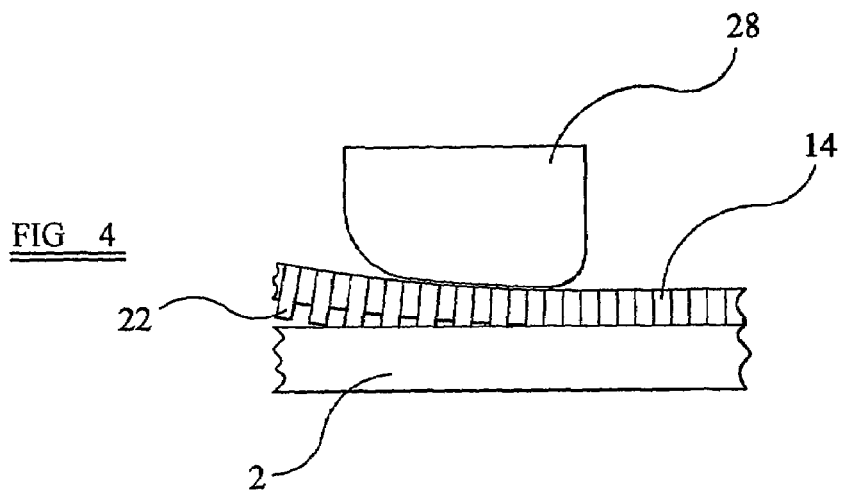
FIGS. 4 and 5 are side views showing alternative press arrangements for use in the apparatus of FIG. 1.

Referring to FIG. 1, an electric heater, such as for use in a cooking appliance, is manufactured by providing a base 2 of thermal and electrical insulation material. The thermal and electrical insulation material suitably comprises microporous thermal and electrical insulation material and is optionally provided in a metal support dish 4.

The base 2 of insulation material is arranged to be located on a supporting means 6 which is connected to a drive mechanism 8 which operates to effect rotational motion of the base 2, as indicated by arrow 10, and/or translational motion of the base 2, as indicated by arrows 12.

An elongate corrugated metal ribbon heating element 14 is produced in well known manner from a substantially planar ribbon 16. The heating element 14 has an upper edge 18 and a lower edge 20. The lower edge 20 is provided with spaced-apart tabs or legs 22, although this is not essential. The tabs or legs 22 can be formed as an integral part of the heating element 14 or can be manufactured separately and secured to the heating element 14, such as by welding, and such that they extend edgewise from the heating element 14.

The ribbon heating element 14 is arranged to be progressively fed and guided through a tube or channel means 24 into overlying edgewise relationship with the base 2 of thermal and electrical insulation material.

In order to ensure that the ribbon heating element 14 is established and/or maintained in an upstanding overlying edgewise relationship with the surface of the base 2, the heating element 14 is passed through an arrangement 26, as shown in FIG. 2, located at the end of the tube or channel means 24. The arrangement 26 comprises intermeshing rotatable gear wheels 27, complementary to a corrugation profile of the ribbon heating element 14 and between which the heating element 14 is fed.

The tube or channel means 24 is fixed and the heater base 2 is arranged to undergo rotational and/or translational motion relative thereto on its supporting means 6, by means of the drive mechanism 8.

The base 2 is caused to undergo appropriate rotational and/or translational motion in synchronisation with progressive feeding of the heating element 14 through the tube or channel means 24. As the heating element 14 advances progressively into overlying edgewise relationship with the base 2, it passes beneath an arrangement 28 which applies localised pressure edgewise to the upper edge 18 of the heating element 14. The applied pressure from the press arrangement 28 forces the tabs or legs 22 on the lower edge 20 of the heating element 14 into the surface of the base 2 and they become securely embedded in the base 2. In this way, the heating element 14 is secured to the base 2.

By appropriate selection of the rotational 10 and translational 12 motion of the supporting means 6, on which the base 2 is located, during feeding of the heating element 14, a desired pattern of the heating element 14, secured to the base 2, is obtained. An example of such a secured heating element 14 is shown in FIG. 3.

Figure 5:
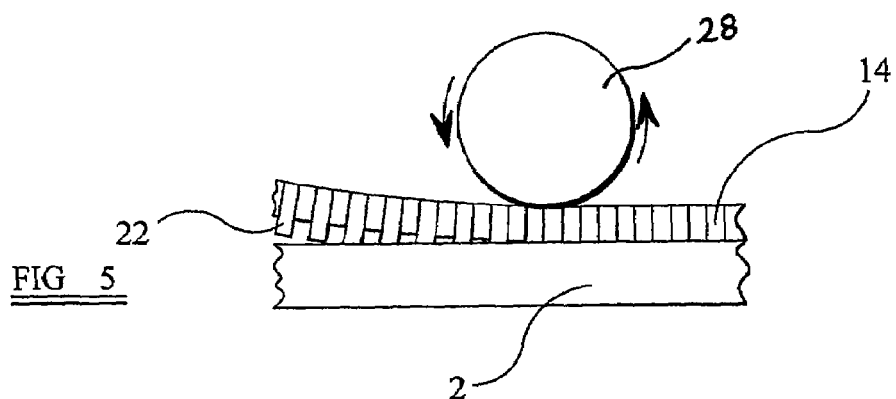

The press arrangement 28 for applying localised pressure to the heating element 14 suitably comprises a block, cam, wheel or roller arrangement. As shown in FIGS. 4 and 5, the press arrangement 28 can be static and fixed at a predetermined distance from the surface of the base 2. The fed ribbon 14 is effectively squeezed between the press arrangement 28 and the surface of the base 2 and forcibly embedded into the base 2. As shown in FIG. 4, the press arrangement 28 comprises a block or cam and as shown in FIG. 5, the press arrangement 28 comprises a wheel or roller. Such wheel or roller 28 can be arranged to be rotated either by contact with the advancing heating element 14 or by a motor means (not shown).

Figure 6:
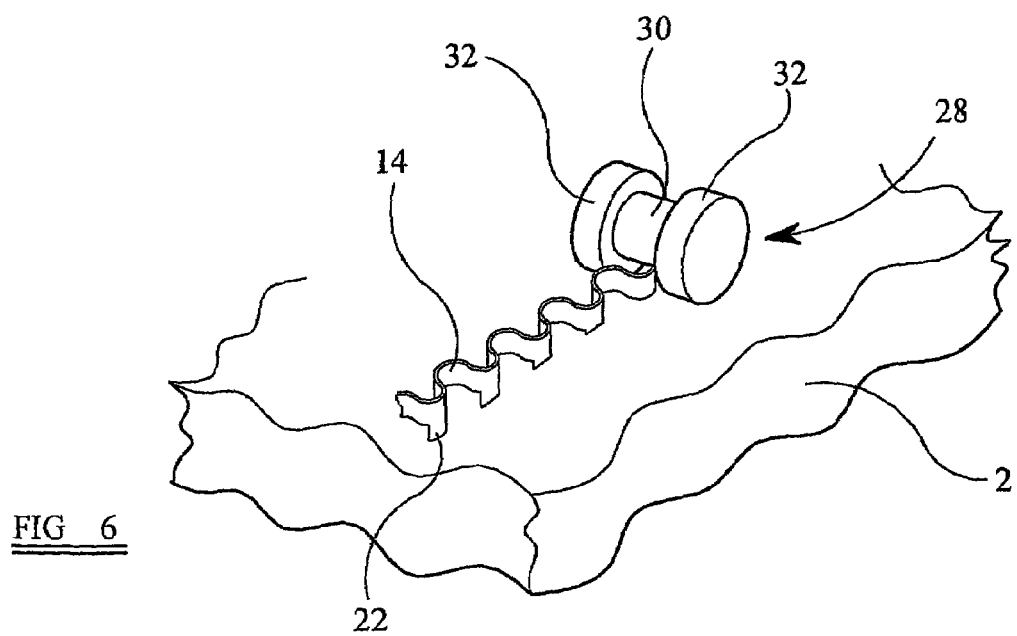
FIG. 6 is a perspective view of a stepped press arrangement for use in the apparatus of FIG. 1.

As shown in FIG. 6, the press arrangement 28 can be a roller of stepped form, having a central portion 30 arranged to engage the upper edge of the heating element 14, and outer portions 32 arranged to engage the surface of the base 2 to limit embedding of the tabs or legs 22 on the heating element 14 into the base 2.

The press arrangement 28 for applying localised pressure to the heating element 14 can be movable and arranged to be advanced towards, and retracted away from, the base 2 by operating means such as electromagnetic, piezoelectric, pneumatic or hydraulic means. In one such arrangement, as illustrated by steps (A), (B) and (C) in FIG. 7, feeding of the heating element 14 is effected in discrete steps, in synchronisation with movement of the base 2. As shown in step (A), a portion of the heating element 14 is advanced and stops under the press arrangement 28. The press arrangement 28 is then advanced by its operating means 34 to apply pressure to the portion of the heating element 14 and embed the tabs or legs thereon into the base 2, as shown in step (B). As shown in step (C), the press arrangement 28 is then retracted by its operating means 34 and the base 2 moves to allow a further portion of the heating element 14 to be advanced into a position ready for being engaged by the press arrangement 28.

In another arrangement, as shown in FIG. 8, the heating element 14, in synchronisation with the base 2, is fed continuously beneath the press arrangement 28, which is adapted to undergo slow or fast cyclic up and down motion to operate on the heating element 14 to press the tabs or legs 22 thereon into the base 2. Fast cyclic up and down motion can be effected by electromagnetic or piezoelectric means 36, such that the press arrangement 28 effectively undergoes vibrating motion during operation.

The invention claimed is:

1. A method of manufacturing an electric heater in which an elongate corrugated metal ribbon heating element (14) is supported edgewise on a base (2) of thermal and electrical insulation material, the heating element (14) having one of an edge portion (22) thereof and at least one part (22) secured thereto and extending edgewise therefrom, secured by embedding in the base (2), the method comprising the steps of: feeding and guiding an elongate corrugated metal ribbon heating element (14) progressively into overlying edgewise relationship with a base (2) of thermal and electrical insulation material; supporting the base (2) and effecting relative motion between a surface of the base (2) and the means (24, 26) of feeding and guiding the heating element (14), such that motion of the base (2) is synchronised with feeding of the heating element (14); and applying localised edgewise pressure to the heating element (14), as it is progressively fed and guided into overlying edgewise relationship with the base (2), to urge the heating element (14) towards the base (2) and cause an edge portion (22) of the heating element (14), or at least one part (22) secured to the heating element (14) and extending edgewise therefrom, to become secured by embedding in the base (2).

2. The method according to claim 1, wherein the elongate corrugated metal ribbon heating element (14) is initially formed by corrugation of a substantially planar elongate metal ribbon (16).

3. A method according to claim 1, wherein the edge portion (22) of the elongate corrugated metal ribbon heating element (14) which is secured by embedding in the base (2) comprises an edge region selected from a continuous edge region (22) of the element (14), and tabs (22) extending from and integral with the element (14).

4. A method according to claim 1, wherein the at least one part (22) secured to the elongate corrugated metal ribbon heating element (14) and extending edgewise therefrom and secured by embedding in the base (2), comprises at least one tab (22) secured to the heating element (14).

5. The method according to claim 1 wherein the step of feeding and guiding the elongate corrugated metal ribbon heating element (14) effected by means of an arrangement selected from a tube arrangement and a channel arrangement (24).

6. The method according to claim 1 wherein the step of feeding and guiding the elongate corrugated metal ribbon heating element (14) includes the further step of establishing and maintaining a desired upstanding orientation of the heating element (14).

7. The method according to claim 6, wherein the step of establishing and maintaining a desired upstanding orientation of the heating element (14) is effected by providing intermeshing rotatable gear wheels (27), complementary to a corrugation profile of the heating element (14), and between which the heating element (14) is arranged to be fed.

8. The method according to claim 1, wherein the step of supporting the base (2) is effected by mechanically driven means, such that motion selected from rotational motion and translational motion of the base (2) is effected in synchronisation with the feeding of the heating element (14) and whereby a desired pattern is effected for the secured heating element (14).

9. The method according to claim 8, wherein the mechanically driven means supporting the base (2) is driven by motor means.

10. The method according to claim 1, wherein the step of applying localised edgewise pressure to the heating element (14) is effected by an arrangement selected from a block, cam, wheel and roller arrangement.

11. The method according to claim 10, wherein the step of applying localised edgewise pressure is effected by stepped form means.

12. The method according to claim 11, wherein the stepped form means of applying localised edgewise pressure is of stepped roller form, having a portion (30) for edgewise engagement with the heating element (14) and at least one portion (32) for engaging the surface of the base (2), whereby embedding of the element (14) into the base (2) is limited.

13. A method according to claim 11, wherein the means (28) for applying localised edgewise pressure is of stepped roller form, having a portion (30) for edgewise engagement with the heating element (14) and at least one portion (32) for engaging the surface of the base (2), whereby embedding of at least one part (22) secured to the element (14) into the base (2) is limited.

14. The method according to claim 1, wherein the step of applying localised edgewise pressure is effected by means movable so as to be movable so as to be sequentially advanced towards, and retracted away from, the base (2).

15. The method according to claim 14, wherein the movable means is selected from electromagnetic, piezoelectric, pneumatic and hydraulic means.

16. The method according to claim 1, wherein the feeding of the heating element (14) is effected by feeding selected from continuous feeding and feeding in discrete steps.

17. The method according to claim 16, wherein the feeding is in discrete steps and is synchronised with sequential advancement and retraction of the means (28) of applying localised edgewise pressure to the heating element (14).

18. The method according to claim 16, wherein the feeding is continuous and the step of applying localised edgewise pressure to the heating element (14) is effected by means which is continuously cyclically advanced and retracted towards and away from the base (2).

19. The method according to claim 18 and including the step of vibrating the cyclically movable means, whereby the movable means is rapidly cyclically advanced and retracted towards and away from the base (2).

20. The method according to claim 1, wherein the base (2) of thermal and electrical insulation material comprises microporous thermal and electrical insulation material.

21. The method according to claim 1, wherein the base (2) of thermal and electrical insulation material is contained in a support dish (4).

22. The method according to claim 21, wherein the support dish (4) comprises metal.

23. Apparatus as claimed in claim 22, wherein the means (26) for establishing and maintaining a desired upstanding orientation of the heating element (14) comprises intermeshing rotatable gear wheels (27), complementary to a corrugation profile of the heating element (14), and between which the heating element (14) is arranged to be fed.

24. A method according to claim 1, wherein the means (28) for applying localised edgewise pressure is fixed at a predetermined distance from the base (2).

25. Apparatus for manufacturing an electric heater in which an elongate corrugated metal ribbon heating element (14) is supported edgewise on a base (2) of thermal and electrical insulation material, the heating element (14) having one of an edge portion (22) thereof and at least one part (22) secured thereto and extending edgewise therefrom, secured by embedding in the base (2), the apparatus comprising: means (24, 26) for feeding and guiding an elongate corrugated metal ribbon heating element (14) progressively into overlying edgewise relationship with a base (2) of thermal and electrical insulation material; means (6, 8) for supporting the base (2) and for effecting relative motion between a surface of the base (2) and the means (24, 26) for feeding and guiding the heating element (14), such that motion of the base (2) is synchronised with feeding of the heating element (14); and means (28) for applying localised edgewise pressure to the heating element (14) as it is progressively fed and guided into the overlying edgewise relationship with the base (2), to urge the heating element (14) towards the base (2) and cause an edge portion (22) of the heating element (14), or at least one part (22) secured to the heating element (14) and extending edgewise therefrom, to become secured by embedding in the base (2).

26. Apparatus as claimed in claim 25, wherein the elongate corrugated metal ribbon heating element (14) is initially formed by corrugation of a substantially planar elongate metal ribbon (16).

27. Apparatus as claimed in claim 25 wherein the edge portion (22) of the elongate corrugated metal ribbon heating element (14) which is secured by embedding in the base (2) comprises an edge region selected from a continuous edge region (22) of the element (14), and tabs (22) extending from and integral with the element (14).

28. Apparatus as claimed in claim 25, wherein the at least one part (22) secured to the elongate corrugated metal ribbon heating element (14) and extending edgewise therefrom and secured by embedding in the base (2), comprises at least one tab (22) secured to the heating element (14).

29. Apparatus as claimed in claim 25, wherein the means (24, 26) for feeding and guiding the elongate corrugated metal ribbon heating element (14) comprises an arrangement selected from a tube arrangement and a channel arrangement (24).

30. Apparatus as claimed in claim 25, wherein the means (24, 26) for feeding and guiding the elongate corrugated metal ribbon heating element (14) is associated with means (26) selected from means for establishing and means for maintaining a desired upstanding orientation of the heating element (14).

31. Apparatus as claimed in claim 25, wherein the means (6, 8) for supporting the base (2) is mechanically driven, such that motion selected from rotational motion and translational motion of the base (2) is effected in synchronisation with the feeding of the heating element (14) and whereby a desired pattern is effected for the secured heating element (14).

32. Apparatus as claimed in claim 31, wherein the means (6, 8) for supporting the base (2) is driven by motor means.

33. Apparatus as claimed in claim 25, wherein the means (28) for applying localised edgewise pressure to the heating element (14) comprises an arrangement selected from a block, cam, wheel and roller arrangement.

34. Apparatus as claimed in claim 33, wherein the means (28) for applying localised edgewise pressure is of stepped form.

35. Apparatus as claimed in claim 34, wherein the means (28) for applying localised edgewise pressure is of stepped roller form, having a portion (30) for edgewise engagement with the heating element (14) and at least one portion (32) for engaging the surface of the base (2), whereby embedding of the element (14) into the base (2) is limited.

36. Apparatus as claimed in claim 34, wherein the means (28) for applying localised edgewise pressure is of stepped roller form, having a portion (30) for edgewise engagement with the heating element (14) and at least one portion (32) for engaging the surface of the base (2), whereby embedding of at least one part (22) secured to the element (14) into the base (2) is limited.

37. Apparatus as claimed in claim 25, wherein the means (28) for applying localised edgewise pressure is movable so as to be sequentially advanced towards, and retracted away from, the base (2).

38. Apparatus as claimed in claim 37, wherein the means (28) for applying localised edgewise pressure is movable by means selected from electromagnetic, piezoelectric, pneumatic and hydraulic means.

39. Apparatus as claimed in claim 25, wherein feeding of the heating element (14) is effected by feeding selected from continuous feeding and feeding in discrete steps.

40. Apparatus as claimed in claim 39, wherein the feeding is in discrete steps and is synchronised with sequential advancement and retraction of the means (28) for applying localised edgewise pressure to the heating element (14).

41. Apparatus as claimed in claim 39, wherein the feeding is continuous and the means (28) for applying localised edgewise pressure to the heating element (14) is arranged to be continuously cyclically advanced and retracted towards and away from the base (2).

42. Apparatus as claimed in claim 41, wherein the means (28) for applying localised edgewise pressure is caused to be vibrated, whereby it is rapidly cyclically advanced towards and away from the base (2).

43. Apparatus as claimed in claim 25, wherein the base (2) of thermal and electrical insulation material comprises microporous thermal and electrical insulation material.

44. Apparatus as claimed in claim 25, wherein the base (2) of thermal and electrical insulation material is contained in a support dish (4).

45. Apparatus as claimed in claim 44, wherein the support dish (4) comprises metal.

46. Apparatus as claimed in claim 25, wherein the means (28) for applying localised edgewise pressure is fixed at a predetermined distance from the base (2).

\* \* \* \* \*